US009032849B2

(12) United States Patent
Azzopardi

(10) Patent No.: US 9,032,849 B2
(45) Date of Patent: May 19, 2015

(54) FLIP CARTRIDGES AND MATERIAL REMOVAL TOOL WITH SAME

(75) Inventor: Donald C. Azzopardi, Walled Lake, MI (US)

(73) Assignee: VALENITE LLC, Madison Heights, MI (US)

( * ) Notice: Subject to any disclaimer, the term of this patent is extended or adjusted under 35 U.S.C. 154(b) by 1102 days.

(21) Appl. No.: 12/506,458

(22) Filed: Jul. 21, 2009

(65) Prior Publication Data

US 2010/0054874 A1  Mar. 4, 2010

Related U.S. Application Data

(60) Provisional application No. 61/092,877, filed on Aug. 29, 2008.

(51) Int. Cl.
  *B23B 29/34* (2006.01)
  *B32B 29/02* (2006.01)
  *B23B 29/034* (2006.01)

(52) U.S. Cl.
  CPC ............ *B32B 29/02* (2013.01); *Y10T 407/2248* (2015.01); *Y10T 407/1934* (2015.01); *Y10T 29/49995* (2015.01); *Y10T 407/23* (2015.01); *Y10T 407/2206* (2015.01); *Y10T 407/193* (2015.01); *B23B 29/03457* (2013.01); *B23B 2260/038* (2013.01); *B23B 2270/025* (2013.01)

(58) Field of Classification Search
  CPC ...................................................... B23B 29/34
  USPC ........ 408/147, 156, 158–160; 82/1.2, 1.4, 1.5
  See application file for complete search history.

(56) References Cited

U.S. PATENT DOCUMENTS

| | | | | | |
|---|---|---|---|---|---|
| 599,655 | A | * | 2/1898 | Huben | 82/1.5 |
| 1,511,898 | A | * | 10/1924 | Makay | 408/159 |
| 2,223,041 | A | * | 11/1940 | Thomas | 408/157 |
| 2,236,944 | A | * | 4/1941 | Gerardi | 408/26 |
| 2,394,612 | A | * | 2/1946 | Horne, Jr. | 82/1.5 |
| 2,398,362 | A | * | 4/1946 | Dare | 408/161 |
| 3,530,745 | A | * | 9/1970 | Milewski | 408/158 |

(Continued)

FOREIGN PATENT DOCUMENTS

| | | | |
|---|---|---|---|
| DE | 3807542 A | * | 9/1989 |
| DE | 29606165 U1 | * | 7/1997 |

(Continued)

OTHER PUBLICATIONS

Notification of the First Office Action for Chinese Application No. 200980142010.6, dated Oct. 8, 2012.

(Continued)

*Primary Examiner* — Sunil K Singh
*Assistant Examiner* — Sara Addisu
(74) *Attorney, Agent, or Firm* — Morgan, Lewis & Bockius LLP

(57) ABSTRACT

A material removal having a plurality of cartridges mounted on an active portion where a plurality of seating members mounted in each of the plurality of cartridges pivots about an axis between a retracted position and an extended position is disclosed. Alternative embodiments have a single pivotable seating member. The pivotable extending seating members operate to extend and retract in a scissors-like motion and enable compact and efficient machining operation, particularly for crank shaft bearing supports.

27 Claims, 7 Drawing Sheets

(56) References Cited

U.S. PATENT DOCUMENTS

| | | | |
|---|---|---|---|
| 1,219,304 A | 1/1971 | Milewski | |
| 3,566,494 A * | 3/1971 | Robinson | 407/18 |
| 3,625,625 A * | 12/1971 | Van Roojen et al. | 408/158 |
| 3,827,821 A * | 8/1974 | Swenson | 408/59 |
| 3,854,839 A * | 12/1974 | Gottelt | 408/129 |
| 3,895,881 A | 7/1975 | Langlois | |
| 3,918,826 A | 11/1975 | Friedline | |
| 3,961,857 A | 6/1976 | Koblesky | 408/83 |
| 4,224,846 A * | 9/1980 | Eysel et al. | 82/158 |
| 4,307,636 A * | 12/1981 | Lacey | 82/1.5 |
| 4,357,846 A * | 11/1982 | Primo | 82/1.5 |
| 4,451,185 A * | 5/1984 | Yamakage | 408/2 |
| 4,505,625 A * | 3/1985 | Lundvall | 408/155 |
| 4,742,738 A * | 5/1988 | Strand | 82/1.11 |
| 4,786,217 A * | 11/1988 | Johne | 408/156 |
| 4,992,010 A * | 2/1991 | Fischer | 408/159 |
| 5,123,787 A | 6/1992 | Hunt | |
| 5,427,480 A * | 6/1995 | Stephens | 408/168 |
| 5,628,589 A * | 5/1997 | Peuterbaugh | 407/15 |
| 5,709,510 A * | 1/1998 | Scheer | 408/156 |
| 6,270,295 B1 * | 8/2001 | Hyatt et al. | 408/1 R |
| 6,318,220 B1 | 11/2001 | Erdel | |
| 6,402,440 B2 | 6/2002 | Soma | |
| 6,729,810 B2 * | 5/2004 | Hyatt et al. | 408/1 R |
| 6,846,136 B2 * | 1/2005 | Brock et al. | 408/154 |
| 7,195,430 B2 * | 3/2007 | Giorda | 408/156 |
| 7,699,567 B2 * | 4/2010 | Nedzlek | 408/158 |
| 7,753,626 B2 * | 7/2010 | Musil et al. | 408/181 |
| 7,841,812 B2 * | 11/2010 | Kuchler | 408/224 |
| 8,070,401 B2 * | 12/2011 | Demarest et al. | 409/259 |
| 8,408,849 B2 * | 4/2013 | Craig et al. | 408/158 |
| 2006/0210369 A1 | 9/2006 | Frejd et al. | |
| 2007/0245535 A1 | 10/2007 | Noggle | |
| 2010/0014933 A1 * | 1/2010 | Nedzlek | 408/156 |

FOREIGN PATENT DOCUMENTS

| | | |
|---|---|---|
| DE | 10 2004 052 211 A1 | 4/2006 |
| DE | 10 2005 028 366 A1 | 12/2006 |
| DE | 102007013153 A1 * | 9/2008 |
| EP | 408379 A * | 1/1991 |
| GB | 1 219 304 | 1/1971 |
| WO | WO 2006/128524 | 12/2006 |

OTHER PUBLICATIONS

Extended European Search Report for 09810413.6, dated Jan. 27, 2012.
English Translation of Notification of the Third Office Action for Chinese Application No. 200980142010.6, dated Dec. 17, 2013.
Notification of the Second Office Action (with English translation) for Chinese Application No. 200980142010.6, dated Jul. 10, 2013.

* cited by examiner

FLIP CARTRIDGES AND MATERIAL REMOVAL TOOL WITH SAME

RELATED APPLICATION DATA

This application claims priority under 35 U.S.C. §119(e) to U.S. Provisional Application No. 61/092,877, filed Aug. 29, 2008, the entire contents of which are incorporated herein by reference.

FIELD

The present disclosure relates to a material removal tool, such as a line bar tool, with cartridges pivotably housing a pair of cutting inserts, which pivot to a cutting position under a biasing force applied to the cartridge, for example by forces applied directly or indirectly by an actuation fluid.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Conventional flexing cartridges housing cutting inserts are used to adjust (extend and retract) the radial positions of cutting inserts on material removal tools. These cartridges are typically anchored at one end of an elongate body to allow flexing at a non-anchored end. A cutting insert is mounted to the non-anchored end and thus could be repositioned radially by biasing the cartridge to flex/unflex. The anchor position and the length of the cartridge contribute to the amount of flexing and the radial displacement of the cutting inserts. To achieve larger radial displacement, greater flexing is generally used.

SUMMARY

An exemplary material removal tool comprises a housing body including a mounting portion and an active portion, a plurality of cartridges mounted on the active portion of the material removal tool, and a plurality of seating members mounted in each of the plurality of cartridges to pivot about an axis between a retracted position and an extended position, the plurality of seating members including a pocket with a seating surface for a cutting insert.

An exemplary method for removing material from a workpiece with a rotating material removal tool comprises inserting an active portion of the material removal tool into a bore of the workpiece, positioning a surface of the workpiece to be machined radially proximate a pivot axis of a plurality of seating members mounted in a cartridge mounted on the active portion of the material removal tool, actuating the plurality of seating members to pivot the plurality of seating members to an extended position, translating the rotating material removal tool in a first axial direction to contact the surface with a first cutting insert mounted in a pocket of a first of the plurality of seating members, and translating the rotating material removal tool in a second axial direction to contact the surface with a second cutting insert mounted in a pocket of a second of the plurality of seating members.

The disclosed material removal tool can increase the density of cutting inserts (number of cutting inserts per cartridge or number of cutting inserts per axial length of tool) and therefore can cut multiple bores simultaneously by utilizing multiple inserts per a bore.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1:
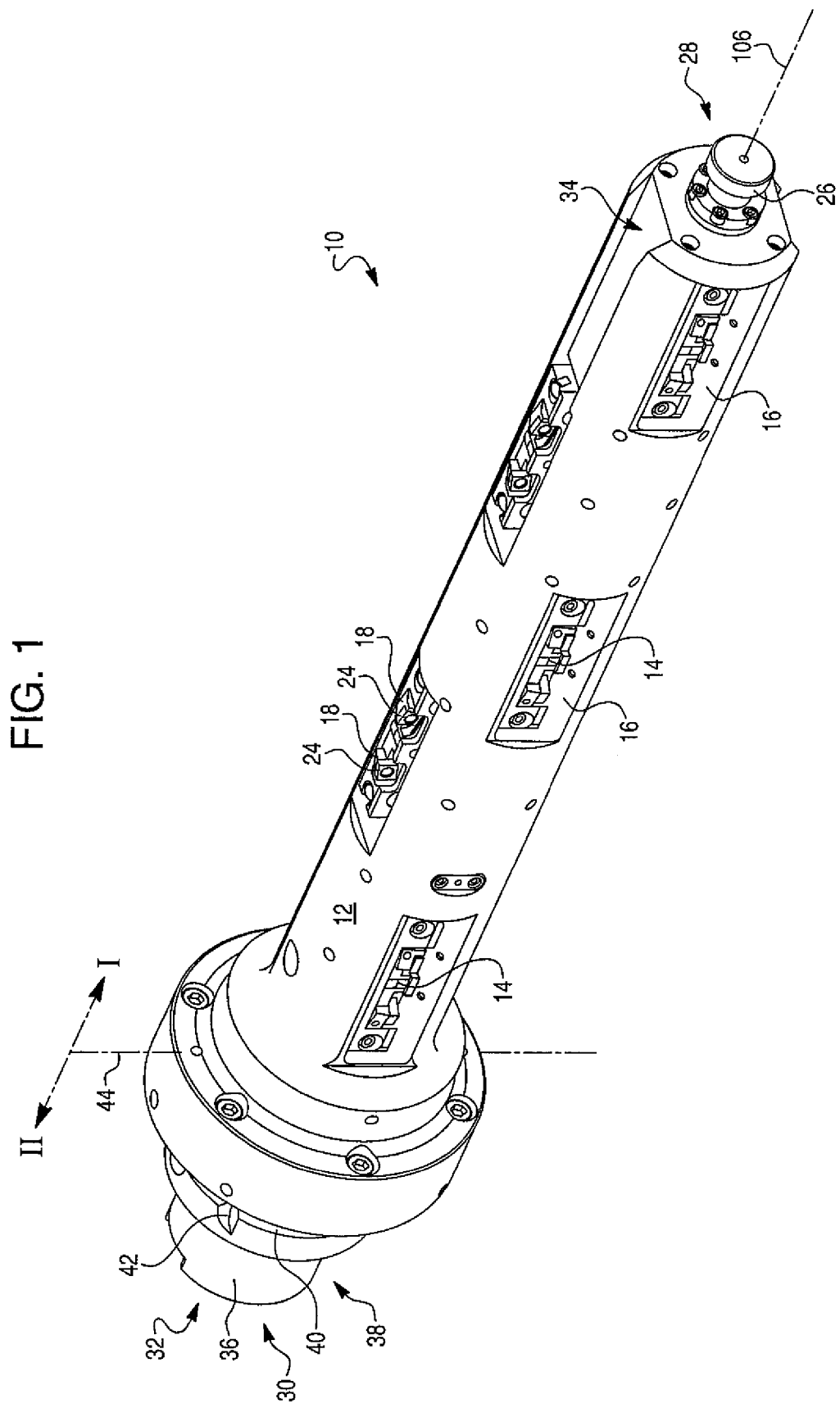
FIG. 1 is a schematic drawing of an exemplary embodiment of a material removal tool.

FIG. 1 is a schematic drawing of an exemplary embodiment of a material removal tool 10. The material removal tool 10 comprises a housing body 12 and includes a plurality of cartridges 14 located in enclosed pockets 16 along the axial length. In a preferred embodiment, the cartridges 14 at substantially the same axial position are radially opposing each other, an arrangement that helps to balance cutting forces in the material removal tool during operation. The plurality of cartridges 14 includes a plurality of pivotable seating members 18. The pivotable seating members 18 include a pocket 20 with a seating surface 22 for a cutting insert 24. Suitable cutting inserts can be of any type, e.g., milling, turning, boring. One exemplary embodiment of suitable cutting inserts is the side locking insert disclosed in U.S. Application Publication No. 2007/0245535, the entire contents of which are incorporated herein by reference. The cutting inserts 24 mounted in the pocket 20 of each of the plurality of seating members 18 in any one cartridge can be the same type or can be of at least two different types. Further, the cutting inserts 24 mounted in the pocket 20 of each of the plurality of seating members 18 in any one cartridge can perform different cutting operations, i.e., semi-finish and finish cutting operations.

Other features of the material removal tool 10 visible in FIG. 1 include a delimiting structure, such as an adjustment assembly 26, at a first end 28 and a connector 30 at a second end 32. When mounted on a machine tool, the first end 28 is a distal end relative to the machine tool and the second end 32 is a mating end for attachment to the machine tool. A slot 34 in the housing body 12 is positioned near the first end 28. The slot 34 mates with a rotary bushing (not shown) for support. During operation, the bushing rotates in conjunction with material removal tool 10 and there is no relative motion between the material removal tool 10 and the bushing. Other features include various openings, connectors and manipulators for assembly and operation of the material removal tool 10.

The connector 30 at the second end 32 of the material removal tool 10 attaches to a machine tool, such as a HAAS VF6 milling machine, for operation. The connector 30 can take any suitable form that allows attachment to a desired machine tool, e.g., attachment to a spindle of the machine tool. In an exemplary embodiment, the connector 30 has a tapered surface 36, for example, tapered rearward or toward the second end 32. A transition piece 38 can optionally be included with the connector 30. An example of a transition piece 38 includes at least one feature for mating to an operating machine or to a storage system. For example, the transition piece 38 can include a circumferential groove 40. The circumferential groove 40, or similar structure, can provide an attachment point for mating the material removal tool 10 to a carousel storage system used in machining operations to store multiple material removal tools. In another example, the transition piece 38 can include a key slot 42. The key slot 42, or similar structure, can provide an orientation or a mating with a corresponding feature on the machine tool when the material removal tool is mounted for use.

The material removal tool can be generally described as having an active portion and a mounting portion. Referring again to the exemplary embodiment of FIG. 1, the active portion I is separated from the mounting portion II at a transition line 44. The transition line 44 can be coincident with the transition piece 38 or, as shown, can be at a different location of the material removal tool 10. The plurality of cartridges 14 are mounted on the active portion I of the material removal tool. During operation, the active portion I is placed near or, for example during boring, inserted into the volume of the workpiece. The mounting portion II generally does not get operatively positioned within the volume of the workpiece. Thus, only locations and features on the active portion I are available for material removal operations.

In the exemplary embodiment of FIG. 1, the active portion I has a generally regular shape, e.g., cylindrical, and has a different diameter than that of the mounting portion II. For an active portion I that has a regular shape, such as a cylinder, the diameter at any point of the active portion I is substantially constant along its axial length and an active volume of the material removal tool 10 can be defined as the volume occupied by the rotating material removal tool based on that diameter of the active portion I. For irregularly shaped active portions, an active volume can be defined as the volume occupied by the rotating material removal tool based on the largest diameter at any point of the active portion. When the active portion of the material removal tool has cutting inserts and is the radially outermost surface along the active portion, then the diameter at the outermost surface of the cutting inserts is used to determine the active volume.

Figure 2:
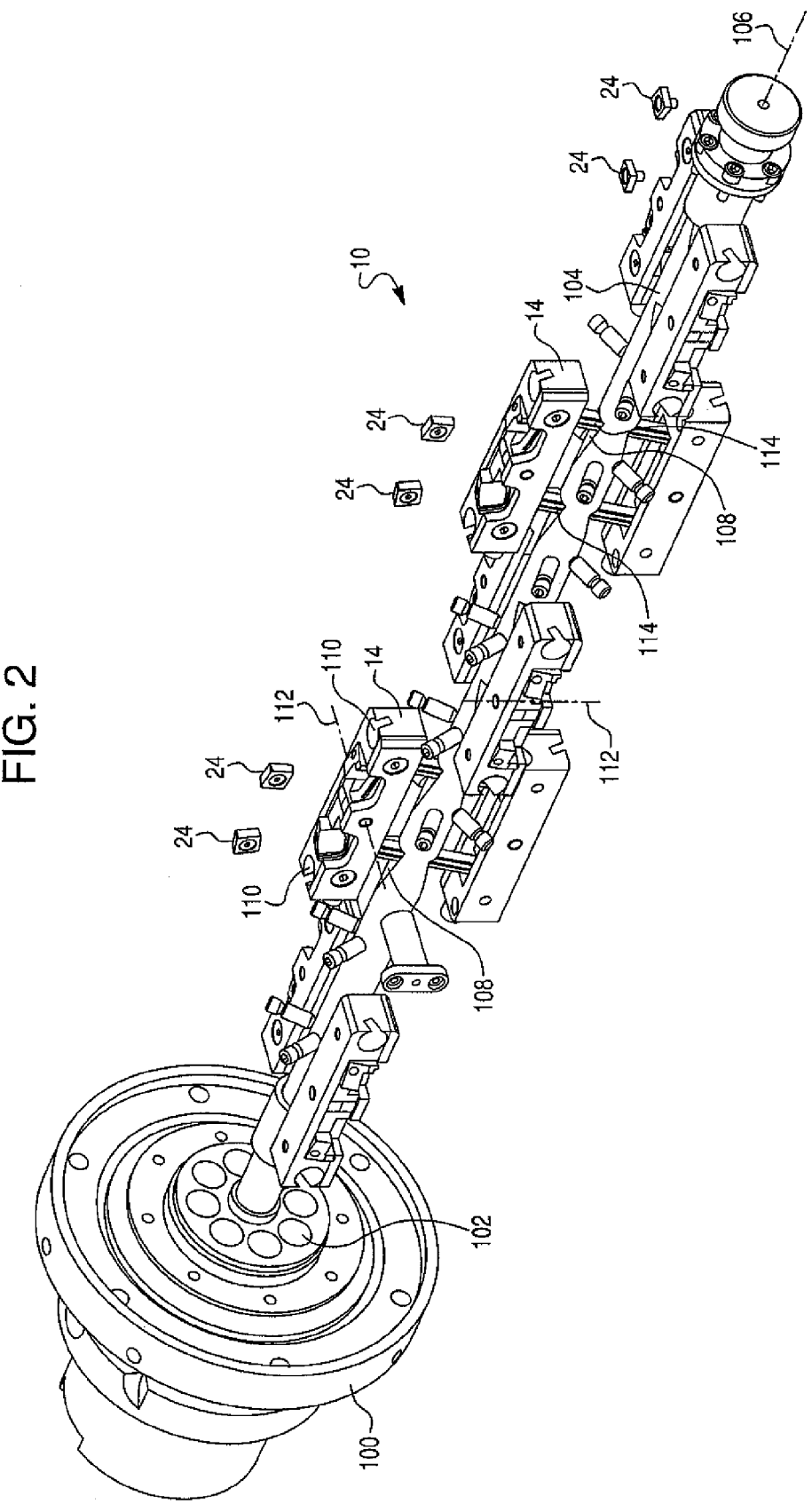
FIG. 2 is a schematic drawing of the exemplary embodiment of a material removal tool of FIG. 1 showing the arrangement of some of the internal components.

FIG. 2 is a schematic drawing of the exemplary embodiment of a material removal tool of FIG. 1 showing the arrangement of some of the internal components. In FIG. 2, the exterior of the material removal tool 10 is not shown to allow viewing of interior features. The material removal tool 10 includes an actuating body 100 in which a piston head 102 is internally positioned in an actuating chamber (not shown). A translating bar 104 includes a first end operably connected to the piston head 102 to axially translate (T) along a first axis 106 between a first position and a second position when the piston head 102 translates. The translating bar 104 can be connected to the piston head 102 by any suitable means. The piston head 102 translates by an actuating fluid. Actuating fluid is supplied above the piston head 102 and vented from below the piston head (and vice versa) via internal passages, which are supplied and vented through spindle. The actuating fluid can be a liquid or a gas. In an exemplary embodiment, the actuating fluid is a liquid and can, in some embodiments, be a liquid that is also used as a coolant by the material removal tool 10.

At pressure, the actuating fluid above the piston head 102 overcomes the biasing force of biasing elements. In exemplary embodiments, the biasing element is preloaded to exert a force to bias the piston head toward the second end 32 of the material removal tool 10, although the opposite arrangement can also be constructed. Examples of biasing elements include mechanical systems, such as springs, dashpots, pistons and bellows, elastic materials, and non-mechanical systems, such as compressible fluids and compressible gases. Biasing can be accomplished by any desired technique. For example, a mechanical biasing element, such as a spring, can be used.

The translating bar 104 includes an actuating surface 108 at a second end or a plurality of actuating surfaces 108 spaced axially along the translating bar 104. In exemplary embodiments, the actuating surface 108 has an outer surface having the shape of a cone or frustum. The actuating surface 108 is formed of a hard, wear resistant material, such as cemented carbide. In exemplary embodiments, the actuating surface 108 onto the translating bar, although any suitable attachment means can be used. The actuating surface can be polished to a desired smoothness. A suitable smoothness for the actuating surface is about (i.e., ±10%) 4 RMS.

Also shown in FIG. 2 is the plurality of cartridges 14. The plurality of cartridges 14 is secured in the housing body (not shown) by any suitable mounting mechanism 110, such as fastener, a cap screw, a bolt or a screw. The cartridge 14 itself is securely mounted relative to the housing body 12. However, the seating members 18 are pivotable about an axis 112. The pivoting of the seating members 18 is actuated by translation of the translating bar 104 operating through actuating surface 108 contacting push pin 114. Although the term pin is used, the push pin can take any geometric shape, such as, for example, curved geometric shapes, and regular and irregular polygonal shapes. The actuating surface 108 has a variable radius along a set axial distance. As the actuating surface 108 moves relative to the push pin 114, the radial position of the end of the push pin 114 along a second axis changes in correlation to the variable radius of the actuating surface 108. This change in radial position of the end of the push pin 114 then directly or indirectly changes the position of or creates a force operating on the pivotable seating member 18. Therefore, as the translating bar axially translates between a first position and a second position when the piston head translates, the plurality of seating members move from a first position, i.e., a retracted position, to a second position, i.e., an extended position. In FIG. 2, the cutting inserts 24 are shown in stand-off relationship to the seating members 18 to show the pockets 20.

Figure 3:
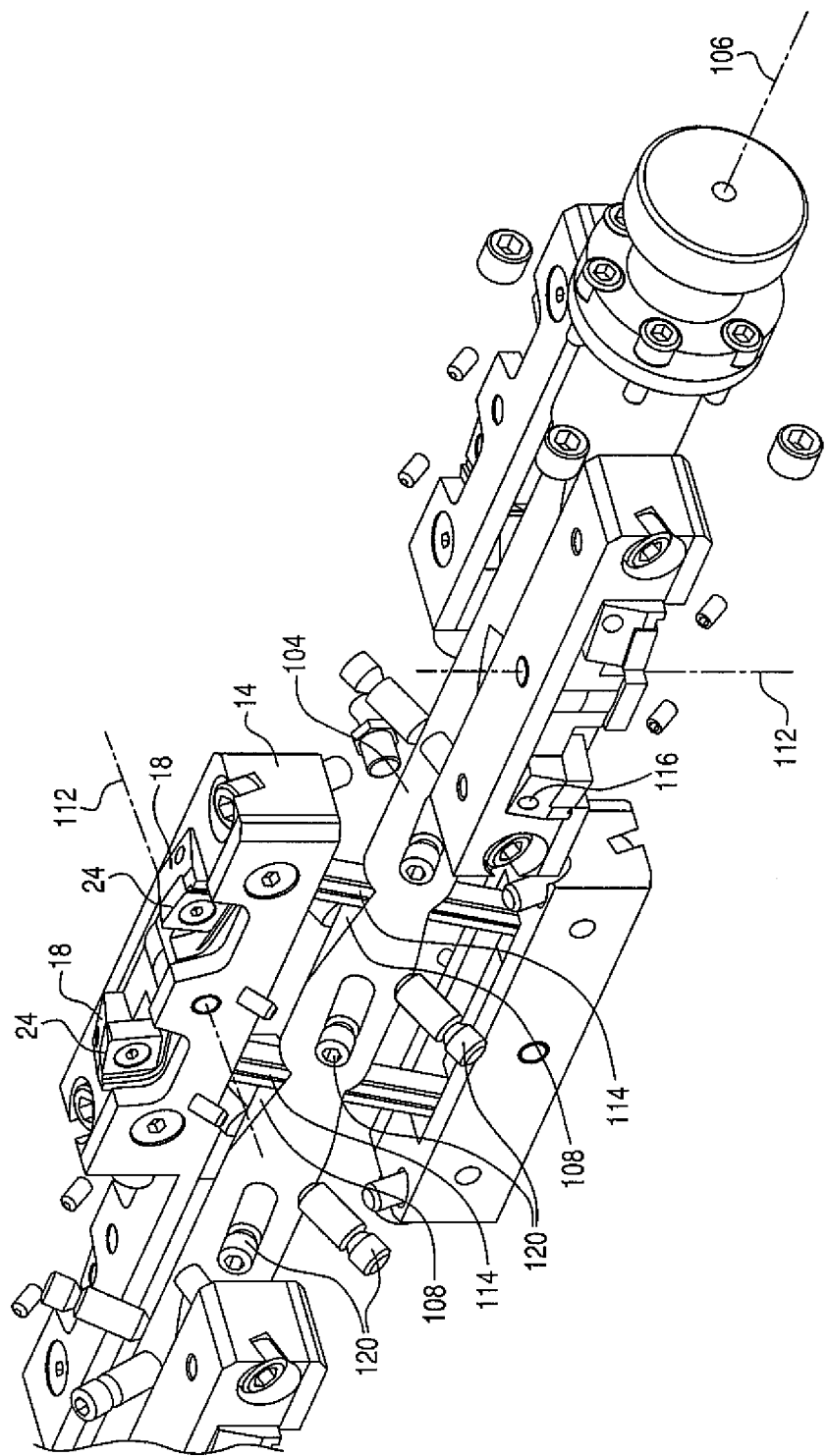
FIG. 3 is a magnified view of the arrangement of some of the internal components.

Turning to FIG. 3, which is a magnified view of the arrangement of some of the internal components, the relative positions of the cartridge 14, the seating members 18, axis 112, translating bar 104, actuating surface 108 and push pin 114 can be observed more clearly. For example, each of the seating members 18 has a separate push pin 114. An adjustment screw 116 in the seating member 18 protrudes inward from the seating member and has an end that contacts the end of the push pin 114. As such, the adjustment screw 116 can be used for fine adjustment of the radial position of the seating member 18. Multiple locating pins 120 are shown distributed circumferentially about the translating bar 104. These locating pins 120 can be used to support and center the translating bar 104.

Figure 4:
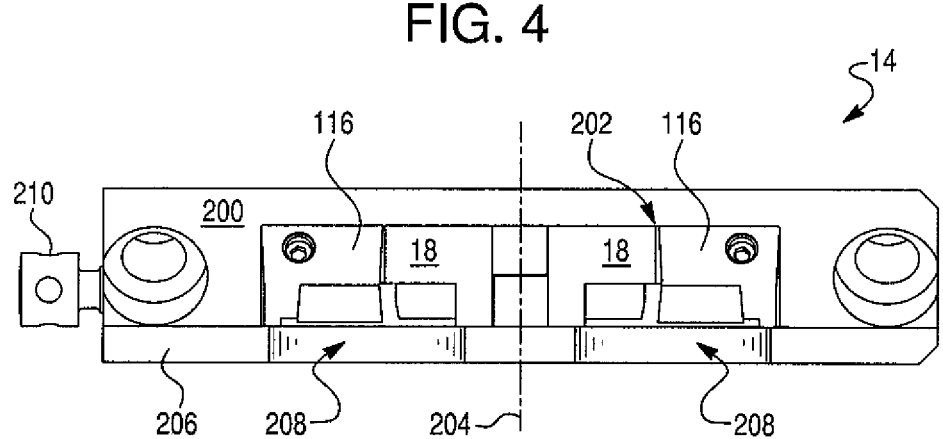
FIG. 4 is a top, plan view of a cartridge with pivotable seating members.

Turning to the cartridge 14, such as exemplary illustrated in top plan view in FIG. 4, the cartridge 14 comprises a body 200 with a cavity 202 in which the pivotable seating members 18 are removably mounted. The cavity 202 is open on two sides of the cartridge 14 to facilitate manufacture and assembly, but other embodiments can have a cavity open to one side, three sides, or more, depending on design. As seen in FIG. 4, the pivotable seating members 18 share a common pivot axis 204. However, the pivotable seating members 18 can alternatively have different pivot axes. Here, the pivotable seating members 18 share a common pivot axis 204 by each of the pivotable seating members cooperating with only a portion of the axis 204 to pivot. As seen in FIG. 4, the pivotable seating member 18 is only half-width in the area of the axis 204 so that the pivotable seating members 18 stack next to each other along the axis 204. In the FIG. 4 embodiment, a closure plate 206 is attached to the body 200 and assists in positioning the pivotable seating members 18 and the associated pivot axis 204. Further, the closure plate 206 has openings 208 to allow mounting, indexing and exchanging of cutting inserts in the pocket 20. In one exemplary embodiment and as seen in the side plan view of FIGS. 6A and 6B. the openings 208 are similar to crenellations, but any suitable geometry of the openings 208 can be used that allows access to the pocket 20.

The cartridge 14 can optionally include adjusting features for both axial and radial positioning. For example, the cartridge can include an axial locating device, such as a locating screw 210, which can be adjusted to change the axial position of the cartridge 14 in the enclosed pockets 16. The enclosed pockets 16 provide a mounting mechanism for the cartridges 14 that leaves a maximum amount of the housing body intact to provide stiffness and strength from the mass of the housing body. Non-enclosed pockets can also be used if the housing body is sufficiently large and/or of sufficient mass to obtain the desired stiffness. A similar radial locating device can also be utilized. In regard to the radial adjustment of the pivotable seating member 18, reference is made to the adjustment screw 116, which was previously shown and described and is shown more clearly in FIGS. 4 and 5.

Figure 5:
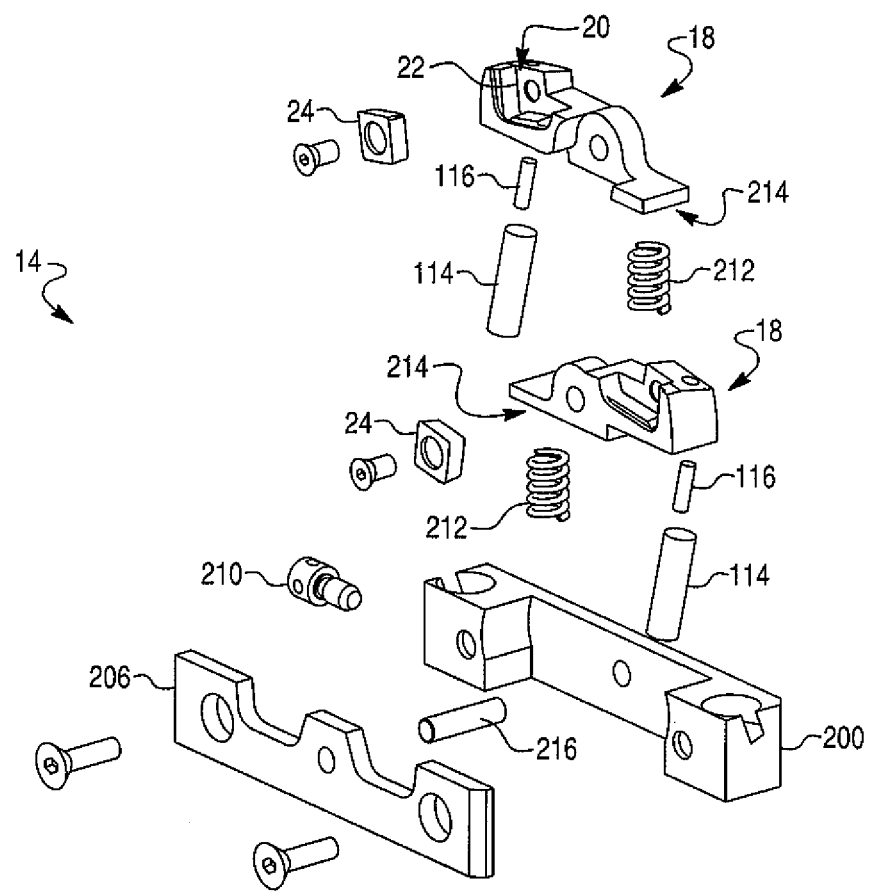
FIG. 5 is a disassembled, perspective view of a cartridge with pivotable seating members.

FIG. 5 is a disassembled, perspective view of a cartridge 14 with pivotable seating members 18. In addition to the features of the cartridge 14 previously shown and described, FIG. 5 also shows the biasing element 212, which acts on an end surface 214 of the individual seating members 18 to bias the seating member 18 in a retracted position, and the axle pin 216 about which the seating members 18 pivot and more clearly shows the adjustment screw 116 and the pocket 20 with the seating surface 22 (the pocket and seating surface on the second seating member 18 is not labeled for clarity).

Figure 6A:
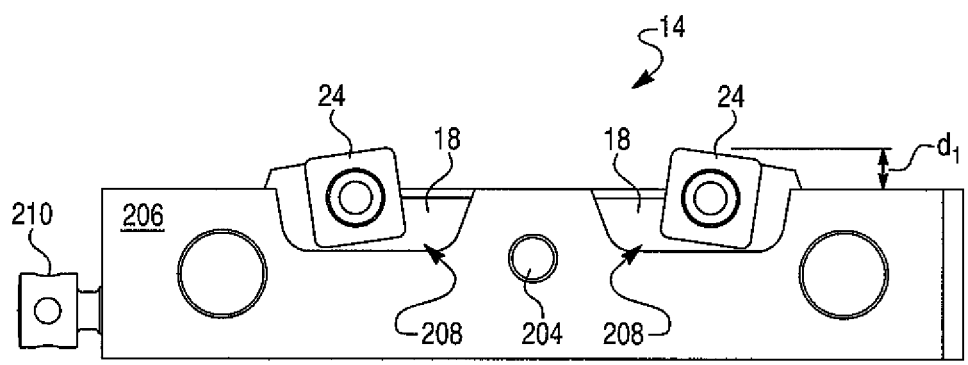
FIGS. 6A and 6B are side plan views of a cartridge with pivotable seating members showing the seating members (and associated cutting inserts) in a retracted position (FIG. 6A) and in an extended position (FIG. 6B).
Figure 6B:
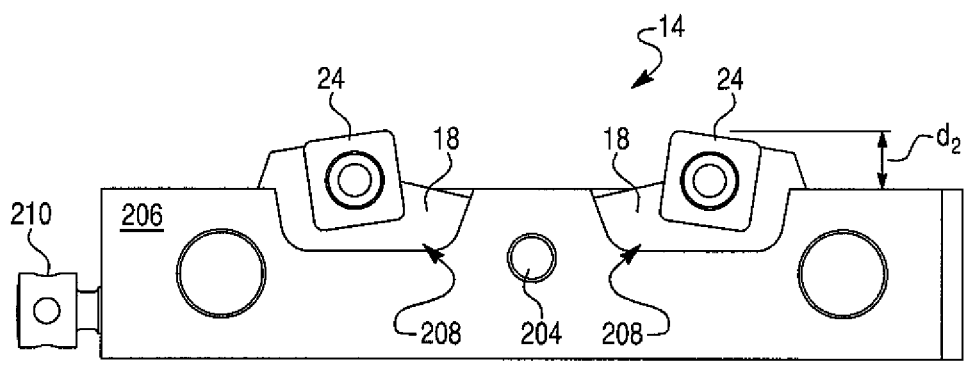

FIGS. 6A and 6B show the seating members 18 (and associated cutting inserts 24) in a retracted position (FIG. 6A) and in an extended position (FIG. 6B). In the retracted position (6A), a biasing member, such as a torsional spring positioned about the axis or an axial spring positioned to perate lever-like on a surface of the seating member, biases the seating member 18 in the retracted position. In the extended position (FIG. 6B), the seating members 18 have been moved radially outward and pivoted inward toward each other in a scissor-like motion (M) by operation of the push pin 114 contacting the adjustment screw 116 and being moved radially outward by the change in radial position of the actuating surface 108 of the translating bar 104. Pivoting the seating members 18 between the retracted and extended positions can be either simultaneous or sequential and can be controlled based on the design and operation of the translating equipment such as the translating bar and actuating surfaces. A typically radial difference between the retracted position and the extended position is on the order of millimeters, e.g., 1-3 millimeters or about 1.5 millimeters. Furthermore, the seating members 18 in any one cartridge 14 do not have to be at the same radial distance in either the retracted or extended positions.

Figure 7C:
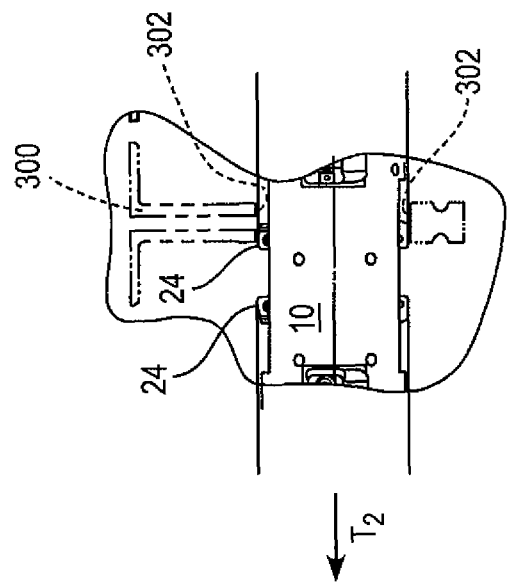
FIGS. 7A to 7C illustrate different operating positions for the pivotable seating members (and associated cutting inserts) while machining a workpiece.
Figure 7B:
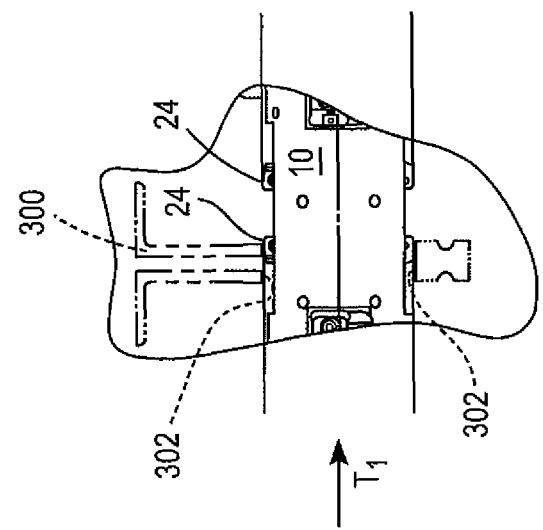
Figure 7A:
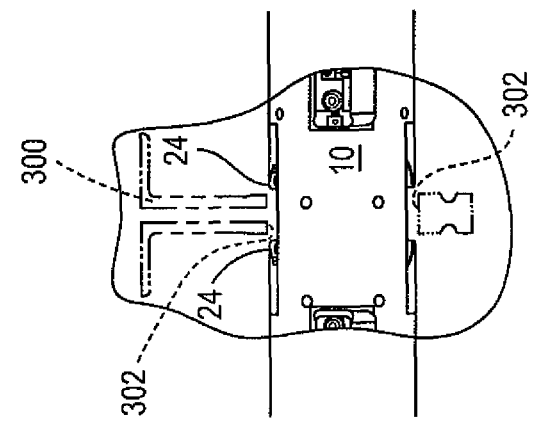

FIGS. 7A to 7C illustrate different operating positions for the pivotable seating members (and associated cutting inserts) while machining a workpiece. In the illustrated example, the workpiece 300 is a crank shaft bearing support and is shown in partial view; similarly, only a portion of the material removal tool 10 is shown.

FIG. 7A illustrates a starting position for removing material from the workpiece. An active portion of the material removal tool 10 is inserted into a bore of the workpiece 300. The active portion is positioned relative to the workpiece to position a surface 302 of the workpiece to be machined radially proximate a pivot axis 204 of a plurality of seating members 18 mounted in a cartridge mounted on the active portion of the material removal tool. Because the illustrated cartridges is mounted in an enclosed pocket, the cartridge is not visible in the FIGS. 7A to 7C views. As seen in the FIG. 7A view and for this material removal operation, the two cutting inserts 24 in any one cartridge are in an initial retracted position and are on opposite sides of the workpiece 300. In the retracted position, the outermost surface of the cutting insert 24 is at a distance $d_1$ from the surface of the seating member 18 (see FIG. 6A).

The plurality of seating members are then actuated to pivot to an extended position and the rotating material removal tool is translated in a first axial direction $T_1$. In the extended position, the outermost surface of the cutting insert 24 is at a distance $d_2$ from the surface of the seating member 18 (see FIG. 6B), where $d_2$ is greater than $d_1$. This movement contacts the extended cutting insert 24 mounted in a pocket of a first of the plurality of seating members with the surface 302 of the workpiece to be machined and removes some of the material. FIG. 7B shows the material removal tool with the seating members in the extended position and after translating the tool in the first axial direction, i.e., at the completion of the first machining operation.

Subsequently, the material removal tool is axially translated in a second axial direction $T_2$. This movement contacts the extended cutting insert 24 mounted in a pocket of a second of the plurality of seating members with the surface 302 of the workpiece to be machined and removes some of the material. FIG. 7C shows the material removal tool with the seating members in the extended position and after translating the tool in the second axial direction, i.e., at the completion of the second machining operation.

Because the radial position of the cutting insert mounted in a pocket of a second of the plurality of seating members are greater than the radial position of the cutting insert mounted in a pocket of a first of the plurality of seating members, the first cutting operation removes some material and the second cutting operation removes more material. In addition, the different cutting operations allow use of different cutting insert types. For example, the cutting insert mounted in a pocket of a first of the plurality of seating members can be a semi-finish cutting insert and the cutting insert mounted in a pocket of a second of the plurality of seating members can be a finish cutting insert. The above method forms a finished surface of the bore in one stroke of the material removal tool, i.e., a forestroke and a backstroke.

The above first and second cutting operations have been described with the plurality of seating members extending once and retracting once. In such an operation, the first cutting insert 24 potentially contacts the surface 302 of the workpiece to be machined during both translation in the first axial direction and translation in the second axial direction. This can cause undesirable cutting defects during the backstroke. As an alternative, the seating members can be actuated more times. For example, after translating the rotating material removal tool in the first axial direction and before contacting the surface with the second cutting insert, preferably before translation in the second axial direction begins, the plurality of seating members are actuated to pivot the plurality of seating members to a retracted position. This disengages the first cutting insert from the surface of the workpiece or from potentially contacting the surface of the workpiece. The rotating material removal tool is then partially translated in the second axial direction to move the first cutting insert past the workpiece, and the plurality of seating members are reactuated to pivot the plurality of seating members to the extended position. Translation in the second axial direction is then completed with the cutting insert 24 mounted in a pocket of a second of the plurality of seating members contacting the surface 302 of the workpiece to be machined and removing some of the material.

After completion of cutting operations, the plurality of seating members are actuated to pivot the plurality of seating members to a retracted position and the active portion of the material removal tool can be withdrawn from the bore of the workpiece.

To further ensure against unwanted contact between the cutting inserts and the workpiece during operation, in the retracted position, the plurality of seating members are each inward of an outermost surface of the active portion, and wherein in the extended position, the plurality of seating members are each outward of the outermost surface of the active portion.

Although only one cutting position is shown in FIGS. 7A to 7C, the same cutting operations can be accomplished at multiple cutting positions of the material removal tool to cut multiple bores simultaneously utilizing multiple inserts per bore.

Benefits of the disclosed material removal tool includes balanced cutting forces (as compared to single point cutting) and longer tool life between insert changes. In addition, because the forward and back stroke is minimized by the closer positioning of the two cutting inserts relative to each other, non-cutting time is reduced and cutting operations are more efficient.

Figure 8:
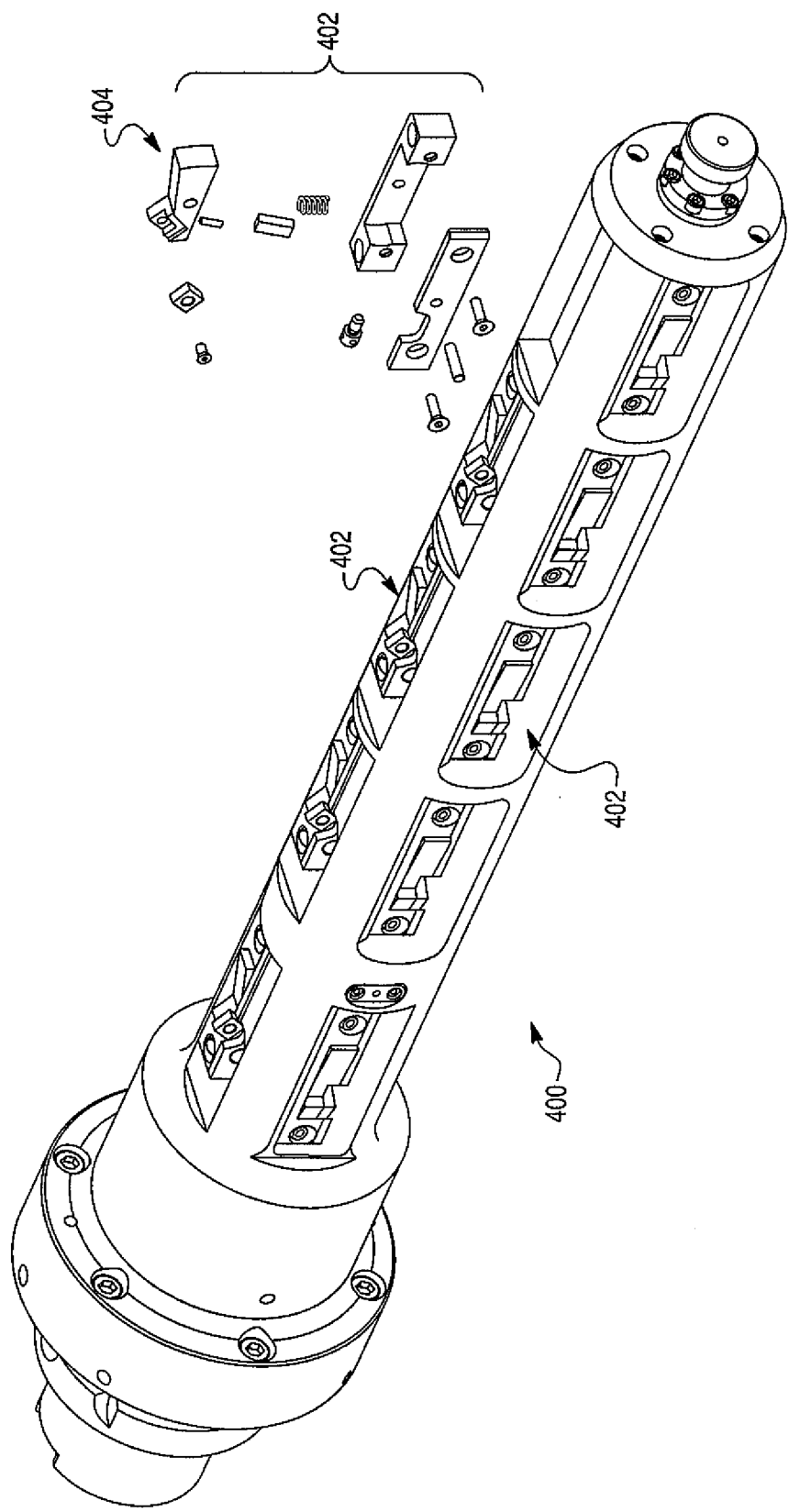
FIG. 8 is a schematic drawing of an exemplary embodiment of a material removal tool with an alternative exemplary embodiment of a cartridge with a single pivotable seating member.

In an optional embodiment, the cartridge can include only one pivotable seating member, with suitable features as shown and described herein with respect to cartridges with a plurality of pivotable seating members. FIG. 8 is a schematic drawing of an exemplary embodiment of a material removal tool with an alternative exemplary embodiment of a cartridge with a single pivotable seating member. In the FIG. 8 view, a material removal tool 400 has a plurality of cartridges 402 with a single pivotable seating member 404. One of the cartridges 402 is shown in disassembled, perspective view and the individual components thereof can be viewed. Cutting operations using the material removal tool 400 with a cartridge 402 with only one pivotable seating member 404 can be completed in a single axial translation of the material removal tool, with suitable other operations, actuations, extensions and retractions as shown and described herein with respect to cutting operations with material removal tools with cartridges with a plurality of pivotable seating members. The alternative embodiment of the cartridge 402 including only one pivotable seating member 404 can be used, for example, on material removal tools with active portions defined by short axial lengths that may only accommodate such cartridges, which can occupy a shorter axial length of the active portion due to having only a single pivotable seating member.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
a housing body including a mounting portion and an active portion;
a plurality of cartridges mounted on the active portion of the material removal tool; and
a plurality of seating members mounted in each of the plurality of cartridges to pivot about an axis between a retracted position and an extended position, the plurality of seating members including a pocket with a seating surface for a cutting insert,
wherein, in the plurality of cartridges, the axis is located transverse to a longitudinal axis of the tool and axially between the pocket of a first of the plurality of seating members and the pocket of a second of the plurality of seating members.

2. The material removal tool of claim 1, wherein the plurality of seating members in each of the plurality of cartridges pivot about a common axis.

3. The material removal tool of claim 1, wherein the plurality of seating members in any one cartridge pivot simultaneously about the axis to the extended position.

4. The material removal tool of claim 3, including a cutting insert mounted in the pocket of each of the plurality of seating members, the cutting inserts being of at least two different types.

5. The material removal tool of claim 4, wherein a first of the at least two different types of cutting insert is a semi-finish cutting insert and a second of the at least two different types of cutting insert is a finish cutting insert.

6. The material removal tool of claim 1, wherein the plurality of seating members in any one cartridge pivot sequentially about the axis to the extended position.

7. The material removal tool of claim 1, wherein the plurality of seating members are biased in the retracted position.

8. The material removal tool of claim 1, wherein in the retracted position, the plurality of seating members are each inward of an outermost surface of the active portion, and wherein in the extended position, the plurality of seating members are each outward of the outermost surface of the active portion.

9. The material removal tool of claim 8, wherein the extended position of a first one of the plurality of seating members in one cartridge is at a different radial distance relative to an axis of the material removal tool than is the extended position of a second one of the plurality of seating members in the one cartridge.

10. The material removal tool of claim 1, wherein the plurality of cartridges are removably mounted on the active portion of the material removal tool.

11. A method for removing material from a workpiece with the material removal tool of claim 1, the method comprising:

inserting the active portion of the material removal tool into a bore of the workpiece;

positioning a surface of the workpiece to be machined radially proximate the pivot axis of the plurality of seating members mounted in the cartridge mounted on the active portion of the material removal tool;

actuating the plurality of seating members to pivot the plurality of seating members to the extended position;

translating the rotating material removal tool in a first axial direction to contact the surface with a first cutting insert mounted in the pocket of a first of the plurality of seating members; and translating the rotating material removal tool in a second axial direction to contact the surface with a second cutting insert mounted in the pocket of a second of the plurality of seating members.

12. The method of claim 11, wherein, after translating the rotating material removal tool in the first axial direction and before contacting the surface with the second cutting insert, the plurality of seating members are actuated to pivot the plurality of seating members to a retracted position, the rotating material removal tool is translated in the second direction to move the first cutting insert past the workpiece, and the plurality of seating members are reactuated to pivot the plurality of seating members to the extended position.

13. The method of claim 11, wherein the method forms a finished surface of the bore in one stroke of the material removal tool.

14. The material removal tool of claim 1, wherein in each of the plurality of cartridges, the seating members have a reduced width in an area of the axis and are stacked next to each other along the axis.

15. The material removal tool of claim 1, comprising a translating bar internal to the housing body, the translating bar including a plurality of actuation surfaces correspondingly positioned relative to the plurality of cartridges, wherein pivoting of the seating members is actuated by translation of the translating bar operating through the actuating surface contacting a push pin, wherein the actuating surface has a variable radius along a set axial distance, wherein as the actuating surface moves relative to the push pin, the radial position of the end of the push pin along the axis changes in correlation to the variable radius of the actuating surface, and wherein the change in radial position of the end of the push pin directly or indirectly changes the position of or creates a force operating on the seating member.

16. A material removal tool, comprising:

a housing body including a mounting portion and an active portion;

a plurality of cartridges mounted on the active portion of the material removal tool;

a plurality of seating members mounted in each of the plurality of cartridges to pivot about an axis between a retracted position and an extended position, the plurality of seating members including a pocket with a seating surface for a cutting insert;

a piston head in an actuating chamber internal to the housing body; and a translating bar internal to the housing body, the translating bar including a plurality of actuation surfaces correspondingly positioned relative to the plurality of cartridges;

wherein the translating bar includes a first end operably connected to the piston head to axially translate between a first position and a second position when the piston head translates, wherein in the first position, the plurality of seating members are in the retracted position, and wherein in the second position, the plurality of seating members are in the extended position.

17. The material removal tool of claim 16, wherein a pressure of an actuation fluid translates the translating bar.

18. The material removal tool of claim 16, wherein the actuation surface includes a cone or frustum, wherein an axial position of the cone or frustum along a length of the translating bar corresponds to a position of a push rod in operable contact with one of the plurality of seating members.

19. A material removal tool, comprising:

a housing body including a mounting portion and an active portion;

a plurality of cartridges mounted on the active portion of the material removal tool;

a plurality of seating members mounted in each of the plurality of cartridges to pivot about an axis between a retracted position and an extended position, the plurality of seating members including a pocket with a seating surface for a cutting insert; and a translating bar internal to the housing body, the translating bar including a plurality of actuation surfaces correspondingly positioned relative to the plurality of cartridges, wherein cartridges at substantially the same axial position are radially opposing each other, wherein pivoting of the seating members is actuated by translation of the translating bar operating through the actuating surface contacting a push pin, wherein the actuating surface has a variable radius along a set axial distance, wherein as the actuating surface moves relative to the push pin, the radial position of the end of the push pin along the axis changes in correlation to the variable radius of the actuating surface, and wherein the change in radial position of the end of the push pin directly or indirectly changes the position of or creates a force operating on the seating member.

20. The material removal tool of claim 19, wherein the plurality of seating members in each of the plurality of cartridges pivot about a common axis.

21. The material removal tool of claim 20, including a cutting insert mounted in the pocket of each of the plurality of seating members, the cutting inserts being of at least two different types.

22. The material removal tool of claim 19, wherein the plurality of seating members in any one cartridge pivot simultaneously about the axis to the extended position.

23. The material removal tool of claim 19, wherein the plurality of seating members in any one cartridge pivot sequentially about the axis to the extended position.

24. The material removal tool of claim 19, wherein the plurality of seating members are biased in the retracted position.

25. The material removal tool of claim 24, wherein the extended position of a first one of the plurality of seating members in one cartridge is at a different radial distance relative to an axis of the material removal tool than is the extended position of a second one of the plurality of seating members in the one cartridge.

26. The material removal tool of claim 19, wherein in the retracted position, the plurality of seating members are each inward of an outermost surface of the active portion, and wherein in the extended position, the plurality of seating members are each outward of the outermost surface of the active portion.

27. A method for removing material from a workpiece with the material removal tool of claim 19, the method comprising:
- inserting the active portion of the material removal tool into a bore of the workpiece;
- positioning a surface of the workpiece to be machined radially proximate the pivot axis of the plurality of seating members mounted in the cartridge mounted on the active portion of the material removal tool;
- actuating the plurality of seating members to pivot the plurality of seating members to the extended position;
- translating the rotating material removal tool in a first axial direction to contact the surface with a first cutting insert mounted in the pocket of a first of the plurality of seating members; and
- translating the rotating material removal tool in a second axial direction to contact the surface with a second cutting insert mounted in the pocket of a second of the plurality of seating members.

\* \* \* \* \*